United States Patent [19]
Gray

[11] 3,806,232
[45] Apr. 23, 1974

[54] VEHICLE INTERIOR REAR VIEW MIRROR

[75] Inventor: Ronald G. Gray, Westcliff-on-Sea, England

[73] Assignee: Ford Motor Company, Dearborn, Mich.

[22] Filed: Oct. 6, 1972

[21] Appl. No.: 295,614

[30] Foreign Application Priority Data
Mar. 3, 1972  Great Britain...................... 9948/72

[52] U.S. Cl................. 350/303, 350/286, 350/299, 350/288
[51] Int. Cl. ............................................ G02b 5/08
[58] Field of Search .......... 350/303, 299, 307, 288, 350/286, 304

[56] References Cited
UNITED STATES PATENTS
2,763,187  9/1956  Wiener .............................. 350/303
3,012,478  12/1961  Reyner............................ 350/303 X
3,469,837  9/1969  Heilig............................ 350/299 UX
2,573,812  11/1951  Schroeder.................... 350/303 UX
3,708,222  1/1973  Stern................................... 350/303
2,953,062  9/1960  Ford .................................. 350/286

Primary Examiner—Ronald L. Wibert
Assistant Examiner—Michael J. Tokar
Attorney, Agent, or Firm—John J. Roethel; Keith L. Zerschling

[57] ABSTRACT

A vehicle rear view mirror the reflective surface of which is a reflective coating on a plurality of vertically extending strips, the lines of intersection of the planes of the strips with the front planar surfaces of the mirror being vertical and the angles which the individual planes of the vertically extending strips make with the planar surface increasing progressively from the center of the mirror towards the side edges of the mirror.

3 Claims, 3 Drawing Figures

3,806,232

VEHICLE INTERIOR REAR VIEW MIRROR

BACKGROUND OF THE INVENTION

The conventional vehicle interior rear view mirror has a reflective rear surface that is generally parallel to the front surface of the mirror. The horizontal field of view of the mirror is a function of the width of the mirror, the width of the mirror being the longitudinal dimension of the mirror in a direction extending laterally of the vehicle body. With the conventional mirror, the only way that the horizontal field of view can be increased is by making the mirror longer in this width dimension.

It is an object of the present invention to provide a rear view mirror in which the horizontal field of view is significantly increased over that of a conventional mirror of equal width.

SUMMARY OF THE INVENTION

The present invention relates to a motor vehicle rear view mirror in which the reflective rear surface of the rear view mirror is a reflective coating on a plurality of vertically extending strips. The lines of intersection of the planes of the strips with the front planar surface of the mirror are vertical. The angles which the individual planes of the vertically extending strips make with the planar surface increase progressively from the center of the mirror towards the side edges of the mirror.

DESCRIPTION OF THE DRAWINGS

The invention is hereinafter particularly described with reference to the accompanying drawings, in which.

DETAILED DESCRIPTION OF THE INVENTION

Figure 1:
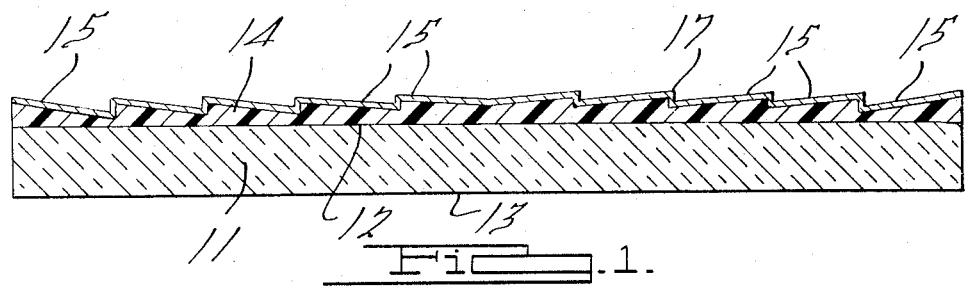
FIG. 1 is a horizontal section through an interior rear view mirror such as used in a motor vehicle.

The interior rear view mirror comprises a piece of glass 11 having parallel surfaces 12 and 13. A film 14 of a transparent plastics material, for example, polyvinyl butyryl, is bonded to the surface 12. This surface is referred to as being at the rear of the mirror although it is of course nearer to the front of the vehicle than is the front surface 13 of the mirror.

Figure 3:
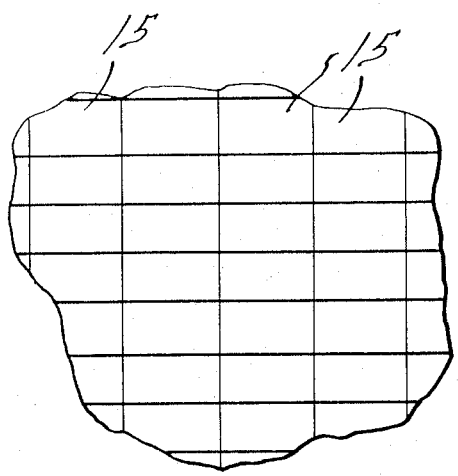
FIG. 3 is a fragmentary view of the rear face of the mirror looking rearwardly from the front of the vehicle towards the rear of the vehicle in which the mirror is adapted to be mounted.

The rear surface of the film 14 appears, as can be seen from FIG. 3, to consist of a large number of rectangular planar sections. The surface comprises a plurality of vertically extending strips 15 (FIG. 1) whose planes are inclined to the surface 12. The lines of intersection of the planes of the strips with the surface 12 are vertical, and the angles which the vertically extending strips 15 make with the surface 12 increase progressively from the center of the mirror towards the side edges of the mirror. The angular increments of the planes of the strips 15 with the surface 12 is between 5 and 15 minutes, and is preferably 10 minutes. The number of vertically extending strips is preferably such that the angles which the outermost strips make with the surface 12 is between 5° and 15°, preferably 10°.

Figure 2:
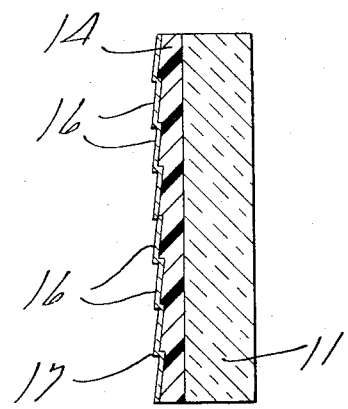
FIG. 2 is a vertical section through the mirror.

As can be seen from FIGS. 2 and 3, each vertically extending strip 15 comprises a plurality of parallel faces 16. The lines of intersection of the planes of the faces with the rear surface of the glass are horizontal, and the planes make an angle of about 30° with the surface 12.

The rear surface of the film 14 is coated with a reflective coating 17.

The effect of the vertical strips 15 is to extend the horizontal field of view of the mirror very considerably. Any vehicle a short distance from the vehicle is reflected by a fairly small number of vertical strips 15. Since the number of strips is small and the strips are themselves planar, the extent of the distortion of the vehicle resulting from the angular differences between strips is small. When the vehicle is some distance away, the number of strips reflecting the image is smaller and consequently the distortion is less.

The effect of the parallel faces 11 is to adapt the mirror, if properly mounted, to be moved from a day position into a night position. When the mirror is in its day position, the image is reflected by the coating 17. When the mirror is in its night position, the coating 17 on the faces 16 reflects the image of the head lens of a car above the eyes of a driver. The light from the head lamps is reflected by the front surface 13 of the mirror and the intensity of the latter light is, of course, much less than the intensity of the light reflected by the coating 17.

The increase in the horizontal field of view may enable the size of the mirror to be considerably reduced, and this will reduce the possibility of vibration of the mirror. Alternatively, the increase in the horizontal field of view may enable the mirror to be made nonadjustable. In the latter case, it could be bonded directly to the windshield and thereby remove the potential source of injury that the mirror stem constitutes in the event of an accident. If the mirror is bonded directly to the windshield it cannot, of course, be moved between a day and night position, but it must be bonded in such a position that light is always reflected into the driver's eyes by the coating 17.

It is to be understood that the invention is not limited to the exact construction illustrated and described above, but that various changes and modifications may be made without departing from the spirit and scope of the invention defined by the following claims:

I claim:

1. A rear view mirror having a front planar surface and a rear surface consisting of a reflective coating on a plurality of vertically extending strips, the front planar surface being the front face of a piece of glass having parallel surfaces, the strips being formed in a single piece of transparent plastic material adhered to the rear surface of the glass, the lines of intersection of the planes of the strips with the front planar surface of the mirror being vertical, and the angles which the individual planes of the vertically extending strips make with the front planar surface increase progressively from the center of the mirror towards the side edges of the mirror.

2. A rear view mirror according to claim 1 in which the strips are planar, the angular increments of the planes of the strips with the front planar surface being between 5 and 15 minutes, and the angles which the outermost strips make with the front planar surface being between 5° and 15°.

3. A rear view mirror according to claim 2 in which each vertically extending strip comprises a plurality of parallel faces and the lines of intersection of the planes of the faces with the rear surface of the glass are horizontal, whereby the reflective surface is composed of a plurality of rectangular planar sections inclined in two senses to the front planar surface of the mirror.

* * * * *